(12) United States Patent
Xu et al.

(10) Patent No.: US 8,842,533 B2
(45) Date of Patent: Sep. 23, 2014

(54) TRAFFIC ENGINEERING AND SERVER SELECTION FOR CONTENT DISTRIBUTION

(75) Inventors: Xiangyang Xu, Shenzhen (CN); Ravishankar Ravindran, San Jose, CA (US); Haiyong Xie, Union City, CA (US); Jianyun Zhu, Santa Clara, CA (US); Liufei Wen, Shenzhen (CN); Guangyu Shi, Cupertino, CA (US); Guoqiang Wang, Santa Clara, CA (US); Pengwei Wang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 867 days.

(21) Appl. No.: 13/012,500

(22) Filed: Jan. 24, 2011

(65) Prior Publication Data
US 2012/0002542 A1    Jan. 5, 2012

Related U.S. Application Data

(60) Provisional application No. 61/361,253, filed on Jul. 2, 2010, provisional application No. 61/361,257, filed on Jul. 2, 2010.

(51) Int. Cl.
*H04L 12/56* (2006.01)
*H04L 29/08* (2006.01)
*H04L 12/801* (2013.01)
*H04L 12/911* (2013.01)

(52) U.S. Cl.
CPC ............. *H04L 67/1004* (2013.01); *H04L 47/10* (2013.01); *H04L 47/70* (2013.01)
USPC ...................................................... 370/230.1

(58) Field of Classification Search
CPC ................ H04L 67/1004; H04L 47/10; H04L 2012/5631; H04L 47/15; H04L 47/2441; H04L 47/70
USPC ....................................... 370/230.1, 231, 235
See application file for complete search history.

(56) References Cited

U.S. PATENT DOCUMENTS 5,878,224 A  *  3/1999  Smith ............................ 709/224
7,941,556 B2 *  5/2011  Canali et al. ................... 709/238
(Continued)

FOREIGN PATENT DOCUMENTS

CN         101026570 A      8/2007

OTHER PUBLICATIONS

Foreign Communication From a Related Counterpart Application, PCT Application PCT/CN2011/073652, International Search Report dated Aug. 11, 2011, 5 pages.

(Continued)

*Primary Examiner* — Min Jung
(74) *Attorney, Agent, or Firm* — Conley Rose, P.C.; Grant Rodolph; Brandt D. Howell

(57) ABSTRACT

An apparatus comprising a traffic engineering (TE) and server selection (SS) component configured to couple to an SS component and operate at a first time scale based on SS policies from the SS component, wherein the SS is configured to operate at a second timescale based on TE policies from the TE and SS component, and wherein the second timescale has a finer time granularity than the first time scale by at least one order of magnitude. Also disclosed is a network component comprising a receiver configured to receive one or more SS policies from a content provider or customer node, a logic circuit configured to compute a plurality of joint TE and SS policies for a plurality of network nodes based on the received SS policies, and a transmitter configured to send the joint TE and SS components to the content provider or customer node.

13 Claims, 7 Drawing Sheets

(56) References Cited

U.S. PATENT DOCUMENTS

| | | | |
|---|---|---|---|
| 2004/0010617 A1 | 1/2004 | Akahane et al. | |
| 2005/0188073 A1* | 8/2005 | Nakamichi et al. | 709/223 |
| 2007/0185997 A1 | 8/2007 | Stecher et al. | |
| 2007/0255842 A1 | 11/2007 | Bolder et al. | |
| 2010/0250656 A1* | 9/2010 | Kisel et al. | 709/203 |
| 2011/0125920 A1* | 5/2011 | Van Der Merwe et al. | 709/235 |
| 2011/0225312 A1* | 9/2011 | Liu et al. | 709/231 |
| 2012/0005371 A1* | 1/2012 | Ravindran et al. | 709/242 |
| 2013/0322451 A1* | 12/2013 | Wang et al. | 370/392 |

OTHER PUBLICATIONS

Foreign Communication From a Related Counterpart Application, PCT Application PCT/CN2011/073652, Written Opinion dated Aug. 11, 2011, 8 pages.

Xie, Haiyong, et al., "P4P: Provider Portal for (P2P) Applications," 5 pages, 2008.

Jiang, Wenjie, et al., "Cooperative Content Distribution and Traffic Engineering," NetEcon '08, Aug. 22, 2008, 6 pages.

* cited by examiner

US 8,842,533 B2

TRAFFIC ENGINEERING AND SERVER SELECTION FOR CONTENT DISTRIBUTION

CROSS-REFERENCE TO RELATED APPLICATIONS

The present application claims priority to U.S. Provisional Patent Application No. 61/361,253 filed Jul. 2, 2010 by Xiangyang Xu et al. and entitled "Practical Solution for Traffic Engineering and Server Selection for Content Distribution," and U.S. Provisional Patent Application No. 61/361,257 filed Jul. 2, 2010 by Haiyong Xie et al. and entitled "Method and Apparatus for Joint Optimal Traffic Engineering and Service Adaptation," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traffic engineering (TE) and adaptive server selection (SS) are common practices by Internet service providers (ISPs) and content providers/customers, respectively, to deliver services and/or content in a network. TE is used to balance the load of traffic in the network, transfer traffic efficiently, reduce delays, reduce bottlenecks, improve error recovery, or combinations thereof. SS is used to improve the allocation and distribution of content to meet the demands of customers or subscribers. The traffic in the network may comprise any network communicated data or services (e.g. Internet traffic and/or other data), including content traffic, such as voice, video, television (TV), and/or other media content. Typically, TE and SS conflict with each other and operate at substantially different time granularities. For example, the TE process may designate a plurality of paths, e.g. on a daily or hourly basis, to transport service efficiently in the network, while the SS process may obtain content from one or more network servers, on a minutes or seconds basis, via a plurality of paths that are not designated by the TE process. The joint TE and SS optimization may be desirable or necessary for a service/content provider to improve service/content delivery, e.g. reduce delays, and improve end user experience, e.g. meet demand.

SUMMARY

In one embodiment, the disclosure includes an apparatus comprising a TE and SS component configured to couple to an SS component and operate at a first time scale based on SS policies from the SS component, wherein the SS is configured to operate at a second timescale based on TE policies from the TE and SS component, and wherein the second timescale has a finer time granularity than the first time scale by at least one order of magnitude.

In another embodiment, the disclosure includes a network component comprising a receiver in a content router or switch configured to receive one or more SS policies from a joint TE-SS component, a logic circuit configured to compute a plurality of joint TE and SS policies for a plurality of network nodes based on the received SS policies, and a transmitter configured to send the joint TE and SS components to other content routers or switches in a network.

In a third aspect, the disclosure includes a computer-implemented method comprising receiving SS policies based on user demand for content, computing TE policies based on the SS policies, generating a routing matrix for one or more network nodes to route traffic from a plurality of servers to one or more user terminals based on the TE policies and the SS policies, and signaling the routing matrix information to the network nodes in a compact and scalable format.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for implementing TE and SS in a joint and efficient manner to improve service/content delivery and meet end user demand. The method may allow a compromise between load balancing in the network, which may also reduce transfer delays, and meeting the end user demand for content. The joint TE and SS process may comprise global level TE part and a SS part that may be in communication with each other and implement different time granularities such that the time granularity requirements of the two processes are supported. The joint TE and SS process may also comprise a local level TE process to handle link level congestion locally and may allow mapping TE and SS policies to a plurality of routing and forwarding tables in network nodes (e.g. routers) at a scalable level.

Figure 1:
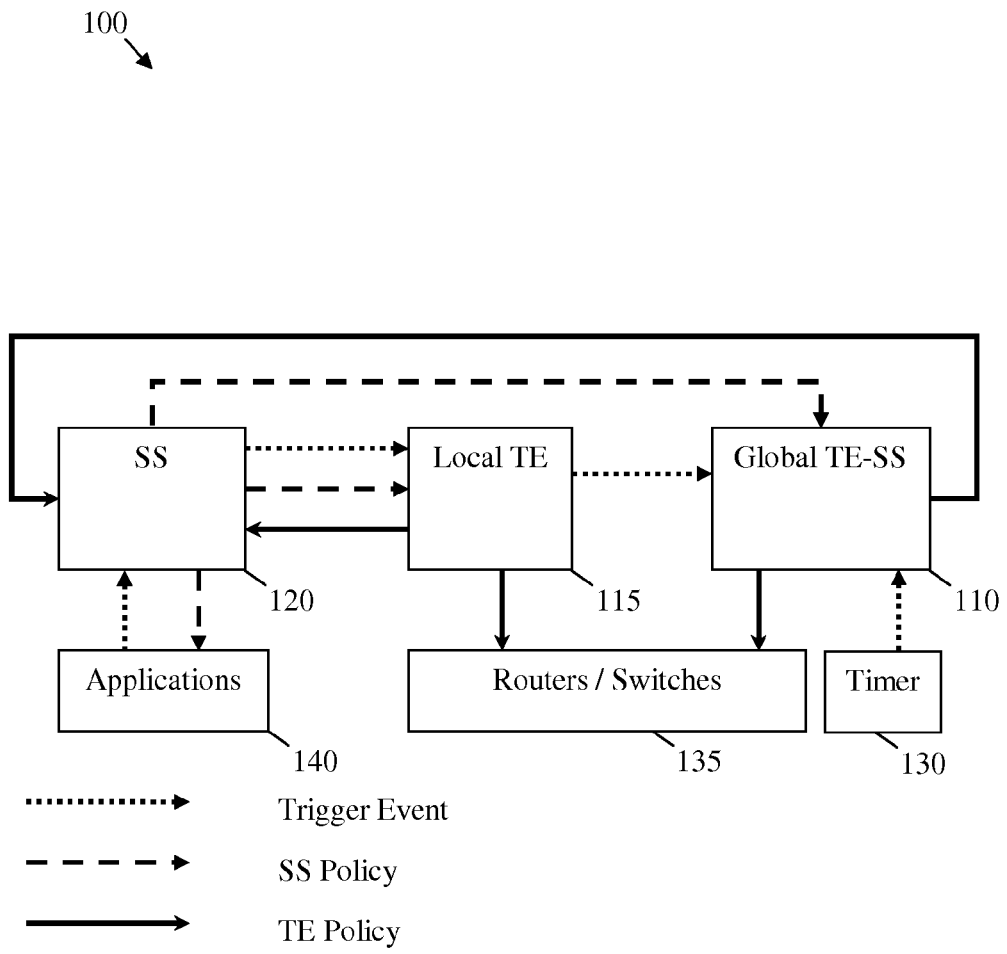
FIG. 1 is a schematic diagram of one embodiment of a joint TE and SS system.

FIG. 1 illustrates an embodiment of a joint TE and SS system 100, which may implement a combined TE and SS process to achieve efficient content delivery in a network and meet end user demand. For example, the network may be any communications network that provides services for customer/subscribers, including Ethernet based networks, Internet Protocol (IP) networks, passive optical networks (PONs), digital line subscriber (DSL) networks, wireless networks, other communications networks, or combinations thereof. The content may comprise data, voice, video, Internet, and/or any application specific content, such as gaming content. The end user may be any content provider/customer of the network ISP or user equipment coupled to the network. For example, the end user may be associated with a communication device at a customer premise or user equipment, such as an optical network terminal (ONU) or a very high bit rate DSL (VDSL) transceiver unit at a residential location (VTU-R). Alternatively, end user may correspond to a home communication equipment, such as a set-top box, and fixed personal device, such as a desktop computer, or a mobile personal device, such as a cellular phone, a laptop computer, or a portable pad.

The joint TE and SS system 100 may solve the joint TE and SS optimization problem, e.g. provide efficient content delivery and meet end user demand, by balancing the traffic load about evenly across the network links as much as possible, and arranging end user content requests in line with the load balancing objective. The joint TE and SS optimization problem solution may also meet the quality of service (QoS) requirements of the end user request. The joint TE and SS system 100 may comprise a global TE-SS component 110, a SS component 120, a timer 130, one or more routers and/or switches 135, and one or more applications 140 that may be implemented on user/customer equipments. The different components of the TE and SS system 100 may be arranged as shown in FIG. 1 and may communicate with one another as indicated by the arrows in FIG. 1. In some embodiments, the joint TE and SS system 100 may also comprise a local TE component 115, which may be positioned between the global TE-SS component 110 and the SS component 120.

The global TE-SS component 110 may be any apparatus, component(s), or device(s) configured to implement the TE process to determine the network links and paths for routing traffic and content. The global TE-SS component 110 may comprise a server or a set of servers and may be operated by an ISP to compute the different TE policies for distributing and routing traffic in the network while maintaining load balancing. The TE policies may be computed based on SS policies provided by the SS component 120. The links and paths may direct content, which may be requested from one or more end users, from one or more content servers to the end users via a plurality of network nodes. The global TE-SS component 110 may also send the TE policies, e.g. policies for traffic routing, to the SS component 120 and the routers/switches 135, as indicated by the solid line arrow.

The local TE component 115 may be any component, device, or node configured to implement a local TE process to compute local TE policies and determine neighboring links for routing traffic and content, reconfigure some of the links determined by the global TE-SS component 110, or both. The local TE policies may be based on SS policies from the SS component 120 as well as the outcome of the local TE policies may influence the SS policies. For instance, the local TE component 115 may rearrange neighboring links and direct traffic accordingly to reduce local traffic congestions, such as due to new requests from the end user. The local TE component 115 may also communicate with neighboring nodes to redirect traffic efficiently. The local TE component 115 may send the local TE policies to the SS component 120 and the routers/switches 135 as indicated by the solid line arrow.

The SS component 120 may be any apparatus, component(s), or device(s) configured to implement the SS process to provide requested content to one or more end users. The SS component 120 may compute SS policies that determine the selected content server(s) and meet user QoS requirements. For instance, the SS components may determine which content servers to provide content to one or more end users based on the location of the server(s) and end user(s) and the availability of the content in the server(s). The SS component 120 may send the SS policies, e.g. as a feedback, to the global TE-SS component 110 and the local TE component 115 (if used) as indicated by the dashed line arrows. The SS component 120 may also provide the SS policies to the applications 140. Generally, the global TE-SS component 110, the local TE component 115, and the SS component 120 will all be part of the same content router.

The timer 130 may be configured to trigger the TE process at the global TE-SS component 110 on a daily or hourly basis, for example every about 24 hours or about few hours to update the computed TE policies and paths. As such, the TE process may handle changing network conditions and/or end user demand for content on a regular basis. The router/switches 135 may be any components, devices, or nodes that are configured to transfer network traffic, including requested user content in the network. For instance, the router/switches 135 may include bridges, routers, and/or switches, which receive, process, and transmit traffic in the network. The routers/switches 135 may transfer network traffic using the links and paths determined by the global TE-SS component 110 and/or the local TE component 115 (if used).

The applications 140 may be used by the end user and hosted on any user equipment, as described above. For example, the applications 140 may comprise software applications (e.g. programs), media content applications (e.g. streaming video, TV, and or music), any other service applications, or combinations thereof. The applications 140 may trigger the SS process at the SS component 120 on a minutes or seconds basis, for example many times during a day or an hour time, and thus substantially more frequently than the TE process. When the SS process is triggered and implemented, the SS component 120 may trigger the local TE component 115 (if used) or the global TE-SS component 110 less frequently to match the time scale or granularity requirements of the TE process. For instance, the SS component 120 may send the computed SS policies to the local TE component 115 on an hourly basis instead of a minutes or seconds basis. In turn, the local TE component 115 may trigger global TE-SS component 110 (by forwarding the SS policies) less frequently, such as on a daily basis.

One of the challenges to solving the joint TE and SS optimization problem is that the objectives of the server selection algorithms, and hence the resulting traffic resulting from the decisions taken by the SS component 120 based on the location and and/or content availability criteria, may not match the suggested objectives of TE objectives of the TE process. Thus, the targets of the TE process and the SS process may conflict with one another, where meeting the SS criteria may not necessarily meet the TE criteria or may deteriorate the network conditions based on the TE process. Another one of the challenges to solving the joint TE and SS optimization problem is implementing the TE and SS processes at the different corresponding time scales.

To address the conflicting TE and SS objectives, the different components of the joint TE and SS system 100 may communicate with each other, via the triggering and feedback mechanisms described above, e.g. by exchanging the TE and SS policies and considering these policies at the different components. For instance, each of the TE process (in the global TE-SS component 110 and the local TE component 115) and the SS process (in the SS component 120) may consider both the TE and SS objectives to reach a compromise between the TE and SS objectives. Additionally, to address the different time scales issue, the global TE-SS component 110, the local TE component 115, and the SS component 120 may be configured to solve the TE and SS optimization problem at three phases that may operate and three different time scales.

At a first phase (e.g. Phase 1), the SS component 120 may determine which of the content servers may deliver content (e.g. in a parallel manner) to an end user and which content portions are delivered from each selected server to meet the user demand. The content server selection may be implemented at the shortest time scale in comparison to other phases, e.g. on a minutes or seconds basis. The SS component 120 may select the servers and split demand among the servers using an algorithm that meets demand and balances load in the network (e.g. on the network links) as much as possible. The inputs to the SS component 120, e.g. to implement the algorithm, may comprise the network topology, the routing policies that may be provided by the global TE-SS component 110 and/or the local TE component 115, associated link metrics, a set of terminal nodes (e.g. associated with the end user), a set of content server nodes, link or path QoS constraints on the network paths and/or servers, or combinations thereof. The outputs of the algorithm at the SS component 120 may comprise indication of the content servers, e.g. for each end user terminal, and the content/demand portion for each server.

At a second phase (e.g. Phase 2), the local TE component 115, for instance at a network node, may determine that a local or adjacent link has reached a congestion threshold, and thus may reconfigure local routing. For example, the local TE component 115 may shift traffic between local links to reduce congestion or avoid further congestion. In an embodiment, the local TE component 115 may implement a local TE process to adjust a local routing matrix for forwarding or directing traffic on the local links. The local TE component 115 may adjust the local routing by communicating with neighboring nodes, e.g. to reduce some incoming traffic on the congested link(s). The local TE process may be implemented at a longer time scale than the SS process of the SS component 120 and at a shorter or about equal time scale than the TE process of the global TE-SS component 110. In an embodiment, if the local TE component 115 is unsuccessful in reducing the congestion on the link, the local TE component 115 may trigger the global TE-SS component 110 to handle at least some of the congested traffic and/or links, such as by re-computing new paths or links to avoid traffic congestion.

At a third phase (e.g. Phase 3), the global TE-SS component 110 may implement the TE process to determine or compute the links and paths for traffic load balancing. The TE process may determine traffic routing in the network, for instance by assigning a routing matrix to each node along the paths or links, as described below. This TE process may be implemented at a longer time scale than the SS process of the SS component 120 and at a longer or about equal time scale than the local TE process of the local TE component 115. The inputs to the global TE-SS component 110 e.g. to implement the TE process, may comprise network topology, link state information, the set of terminal nodes, the set of content server nodes, the bandwidths of the servers, the content traffic demand of the end user(s), background traffic demand (e.g. for other services), or combinations thereof. The outputs of the TE process may comprise the SS policies for the end user terminals and the routing policies (e.g. for the network nodes). The routing policies may further be used as inputs to the SS component 120 in Phase 1, e.g. for subsequent SS implementation that may be triggered by a user application or request.

Figure 2:
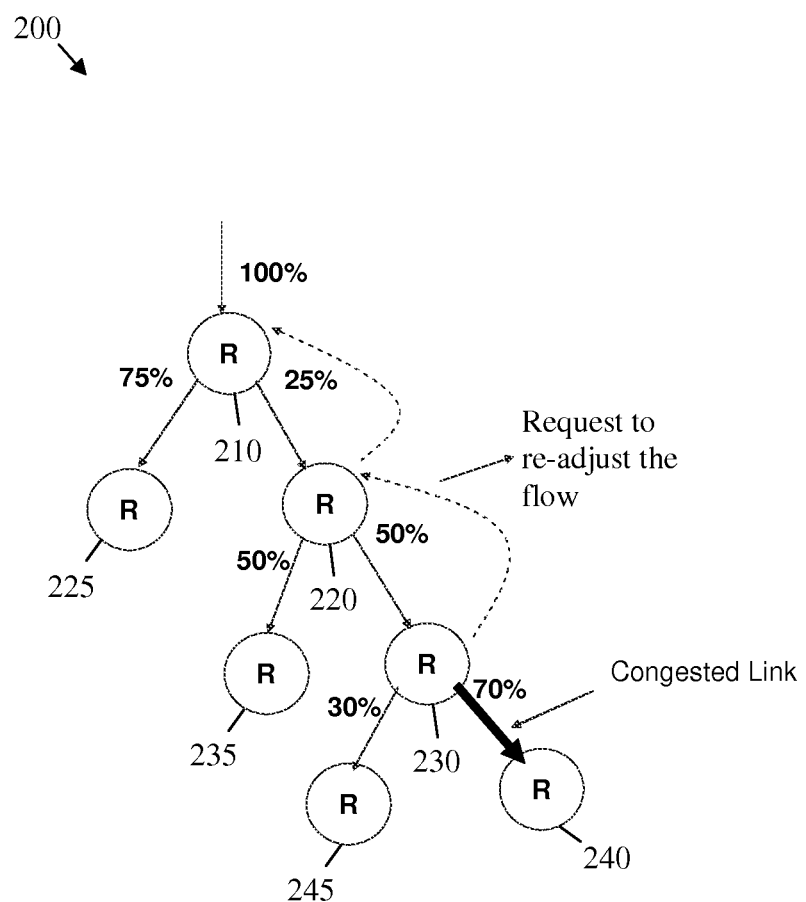
FIG. 2 is a schematic diagram of an embodiment of a local TE scheme.

FIG. 2 illustrates an embodiment of a local TE scheme 200. The local TE scheme 200 may be implemented in coordination between a plurality of network nodes 210-245. For instance, the local TE scheme 200 may be implemented by a local TE component at the node 230, which may be configured substantially similar the local TE component 115. The node 230 may implement a local TE process or algorithm based on a back-pressure technique in coordination with the upstream nodes 220 and 210 that route some of their incoming traffic to the node 230. For instance, when the node 230 detects that one of its links is reaching a congestion threshold, e.g. at about 70 percent of its downstream traffic, the node 230 may identify in its routing table a set of traffic flows from an upstream node, e.g. the node 220. The node 220 may then request from the node 230 to reduce its corresponding flows that contribute to the traffic in the congested link. By doing so, the local TE component may address any unexpected traffic surge on any link due to a flash crowd scenario. Specifically, the local TE component communicates with its upstream neighboring content router to divert some of the traffic loading it to other neighbors of the upstream node.

In response to the request form node 220, the node 230 may divert a portion of the flows that lead to the congested link from its local link to at least one other local link, e.g. based on its local links status. Thus, the node 220 may adjust the portions of flows on its local links. For example, the node 220 may limit the portion of its downstream traffic to the node 230 at about 50 percent and direct the remaining about 50 percent to the node 235. The traffic may be split or directed on the links based on the traffic matrix, which may be provided by the local TE component and/or a global TE-SS component. Based on this back-pressure technique, the node 220 may further request from a higher upstream node, e.g. the node 210, to readjust the flows on its local links if needed. Accordingly, the node 210 may similarly adjust the portions of flows on its local links. For example, the node 210 may limit the portion of its downstream traffic to the node 220 at about 25 percent and direct the remaining about 75 percent to the node 225. The flow redistribution process may be repeated in the upstream nodes until traffic congestion on the link of the node 230 is resolved, e.g. is reduced below the congestion threshold.

Figure 3:
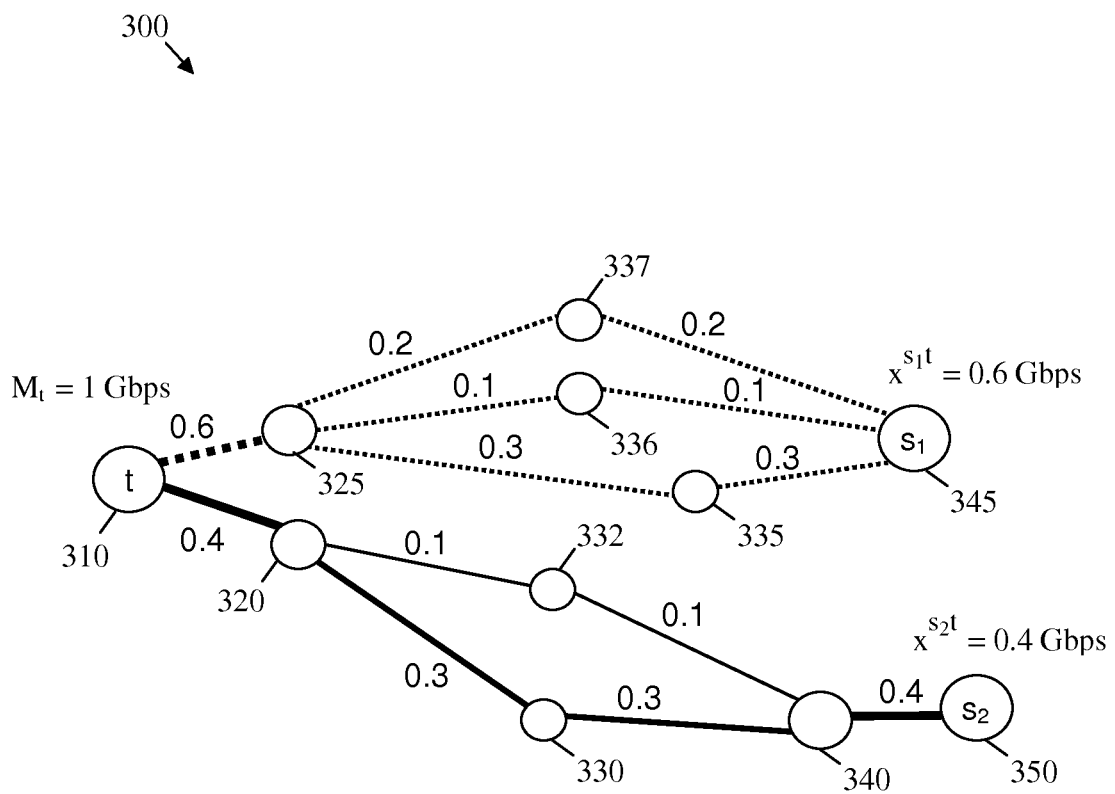
FIG. 3 is a schematic diagram of an embodiment of a multi-server and multi-path allocation.

FIG. 3 illustrates an embodiment of a multi-server and multi-path allocation 300, which may be established based on the joint TE and SS process. The multi-server and multi-path allocation 300 may be implemented for a plurality of nodes 310-350 that may be coupled via a plurality of links, as shown in FIG. 3. The nodes 310-350 may comprise a terminal (t) 310 that may be associated with an end user, a plurality of intermediate nodes 320-340, and a first server ($s_1$) 345 and a second server ($s_2$) 350. As shown in FIG. 3, the terminal 310 may be served by $s_1$ via up to three paths and may be served by $s_2$ via up to two paths. The multi-server and multi-path implementation 300 may include a first level of optimization and a second level of optimization.

The first level of optimization may comprise solving the SS problem of dividing the traffic (or content) demand for terminal t, $M_t$, into portions that are provided by $s_1$ and $s_2$, which is referred to herein as the SS process or solution. The second level of optimization may comprise solving the TE problem of balancing traffic demand between the server-terminal pairs, e.g. $(t,s_1)$ and $(t,s_2)$, into traffic portions that are transmitted via multiple paths. The second level of optimization may be referred to herein as the TE process or solution. Although the multi-server and multi-path allocation 300 includes a single terminal t and two servers $s_1$ and $s_2$, in other embodiments the multi-server and multi-path allocation 300 may comprise any quantity of terminals, servers, and paths between the terminal-server pairs.

The SS solution and the TE solution may be based on the network topology, which may be characterized by the node set N, the link set L, the capacity $c_l$ for each link l in the link set, the terminal node set T, the server node set S, and the traffic demand $m_t$ for each terminal t in the terminal set. The SS solution may provide a routing matrix, $\{r_l^{st}\}$, for each sever-terminal pair st and each link l that determines the traffic portion on the link. The TE solution may provide a traffic matrix, $\{x^{st}\}$, for each sever-terminal pair st, where $$\sum_{s \in S(t)} x^{st} = m_t,$$

$x^{st}$ is the traffic flow for $r_l^{st}$ indicates a portion of $x^{st}$ that is transmitted on link l, and S(t) is the set of servers for terminal t.

An example of the joint TE and SS solution is shown in FIG. 3, where the traffic demand for the end user of terminal t may be equal to about 1 gigabit per second (Gbps). The end user traffic demand may be split between about 0.6 Gbps for $s_1$ and about 0.4 Gbps for $s_2$. The traffic flow portion between $s_1$ and t may be split into three paths at about 20 percent, about 10 percent, and about 30 percent of the total demand (e.g. at about 1 Gbps). The traffic flow portion between $s_2$ and t may be split into two paths at about 10 percent and about 30 percent of the total demand.

Solving the joint TE and SS problem may be resource intensive and require substantially different time scales between the TE and SS process, as described above. Another practical challenge to the joint TE and SS solution is related to enforcing the routing matrix policy in the network, e.g. assigning the routing matrices $\{r_l^{st}\}$ to the corresponding nodes. The routing matrix $\{r_l^{st}\}$ may not be scalable to map the TE policies to the nodes (e.g. routers) routing table entries, e.g. may need transporting a substantially large amount of data. For example, the $\{r_l^{st}\}$ may map to the forwarding entries of each router as:

Source Destination Egress={(egress link,flow proportion)}.

Such mapping may be needed to split the traffic flow of each server-terminal pair to each outgoing corresponding egress link based on, in worst case, $\|S\| \times \|T\|$ traffic flows in the routing table, where $\|S\|$ is the quantity of servers and $\|T\|$ is the quantity of terminals.

To improve the scalability of the routing matrix data, the source address information may be removed or decoupled from the routing tables in the nodes or routers. As such, traffic may be routed as a function of the corresponding destination address. For instance, when a router receives packets, the router may forward the packets under the same policy that may be based on the destination address of the packets regardless of the source address of the packets. As such, the routing table size may be reduced from about $\|S\| \times \|T\|$ entries to about $\|T\|$ entries, since the destination or terminal information may be used without the server or source information.

Figure 4:
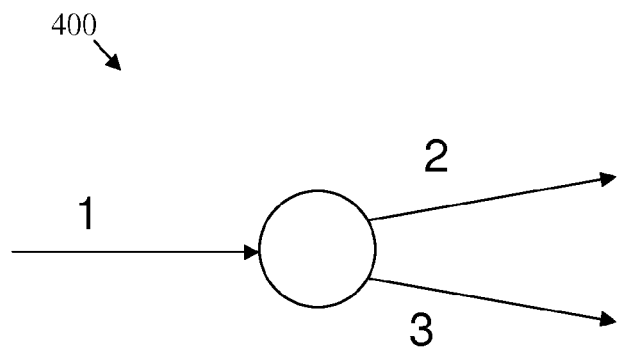
FIG. 4 is a schematic diagram of an embodiment of a router node.

FIG. 4 illustrates an embodiment of a router node 400, which may be assigned a routing matrix. For instance, the router node 400 may correspond to one of the nodes 310-350 and may be located along a path from at least one source server s to at least one destination terminal t. The router node 400 may be coupled to three links, e.g. $l_1$, $l_2$, and $l_3$ (labeled 1, 2, an 3 respectively). The traffic flow on each of the links may be represented by $$f_{li}^t = \sum_s x^{st} r_i^{st},$$

where li is the i-th link (e.g. i=1, 2, or 3). Accordingly, the traffic portion corresponding to li may be calculated as $$p_{li}^t = f_{li}^t \bigg/ \sum_{l \in Lr} f_l^t,$$

where Lr is the set of egress links coupled to the router node 400.

An example of a typical routing matrix for the router node 400 is shown in Table 1. Such routing matrix may combine both source (server) and destination (terminal) information and may not be scalable for mapping the routing table entries of the router node 400, e.g. if $\|S\| \times \|T\|$ is substantially large. The routing matrix may indicate the traffic portion on each egress link, e.g. $l_2$ and $l_3$, for each server-terminal pair combination, e.g. $(s_i, t_1)$, $(s_2, t_1)$, $(s_1, t_2)$, and $(s_2, t_2)$. In Table 1, the rows correspond to the egress links and the columns correspond to the sever-terminal pairs.

TABLE 1

|  | $(s_1, t_1)$ | $(s_2, t_1)$ | $(s_1, t_2)$ | $(s_2, t_2)$ |
|---|---|---|---|---|
| $l_2$ | 0.2 | 0.7 | 1.0 | 0.0 |
| $l_3$ | 0.8 | 0.3 | 0.0 | 1.0 |

Table 2 shows a more scalable configuration of the routing matrix after decoupling or removing the source (or server) information from the routing matrix. In this case, the routing matrix may indicate the combined or aggregated traffic portion on each egress link for each terminal, e.g. $t_1$ and $t_2$, regardless of the source server. In Table 2, the rows correspond to the egress links and the columns correspond to the terminals. By removing the source or server information, the size of the routing matrix in Table 2 is reduced from about $\|S\| \times \|T\|$ entries to about $\|T\|$ entries, e.g. to about half the size of the routing matrix in Table 1.

TABLE 2

|  | $t_1$ | $t_2$ |
|---|---|---|
| $l_2$ | 0.45 | 0.5 |
| $l_3$ | 0.55 | 0.5 |

To further reduce the routing matrix size, a compact data structure may be used to represent the routing matrix. Table 3 shows a more compact and thus more scalable representation of the routing matrix in comparison to Table 2. Specifically, each routing element in the routing matrix, e.g. that indicates a traffic portion for each link and each terminal, may be represented using a combined float or double type value. The combined float/double type value may comprise an integral part that indicates the link and a fractional part that indicates the traffic portion for that link. For example, the float double type value for $t_1$ on $l_2$ may be equal to about 2.45, where the integral part 2 indicates $l_2$ and the fractional part 45 indicates a traffic portion of about 0.45 on $l_2$. In Table 3, the columns correspond to the egress links and the rows correspond to the terminals. Since the links $l_2$ and $l_3$ are indicated by the integral parts, the routing matrix may not explicitly indicate the links for each column or routing element (as the case in Table 2 and Table 1), which reduces the amount of data in the routing matrix.

TABLE 3

| | | |
|---|---|---|
| $t_1$ | 2.45 | 2.55 |
| $t_2$ | 3.5 | 3.5 |

The routing matrix data may be further reduced using a hashing value to represent each destination, e.g. terminal. Table 4 shows a more compact and thus more scalable representation of the routing matrix in comparison to the representations in the tables above. Similar to Table 3, each routing element in Table 4 may be represented using a combined float/double type value without explicitly indicating the corresponding links. Additionally, the terminal labels or indications, e.g. $t_1$ and $t_2$, may be replaced by hashing values, e.g. hash($t_1$) and hash($t_2$), respectively, which may further reduce the data in the routing matrix. The hashing value may be based on the total number of terminals, which is about two in this case. For example, hash($t_1$) may be equal to about 1 and hash($t_2$) may be equal to about two.

TABLE 4

| | | |
|---|---|---|
| hash($t_1$) | 2.45 | 2.55 |
| hash($t_2$) | 3.5 | 3.5 |

Figure 5:
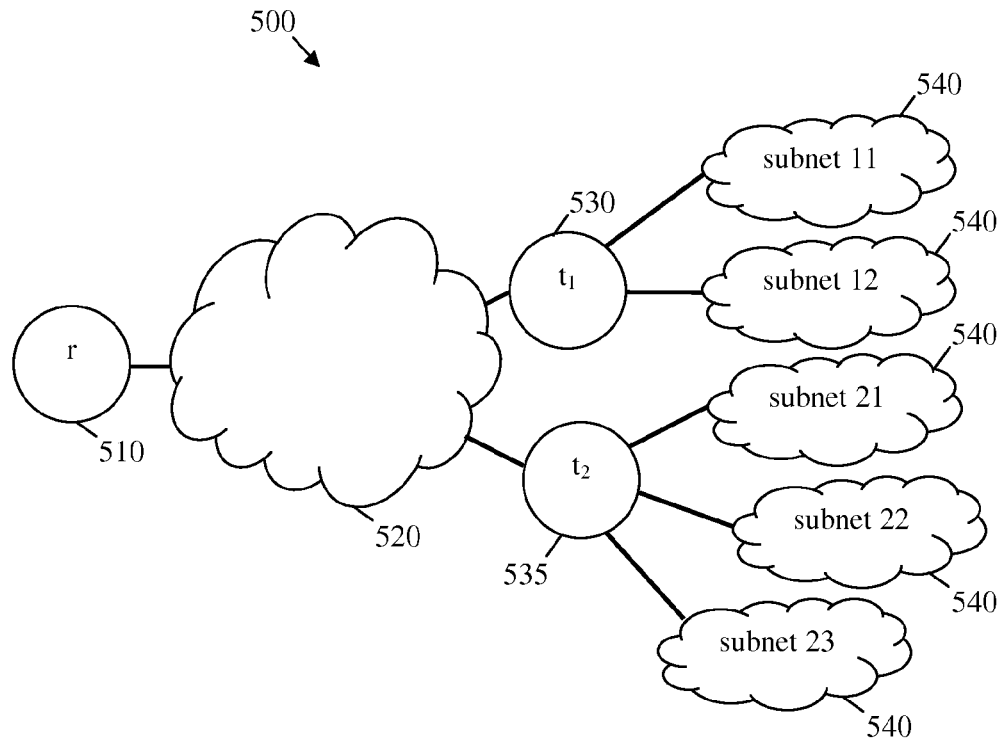
FIG. 5 is a schematic diagram of an embodiment of a tree aggregate network.

In some cases, the routing matrix associated transported data may be further reduced, such as in the cases of a tree aggregated network, e.g. a metropolitan area network. FIG. 5 illustrates an embodiment of a tree aggregated network 500, which may comprise a plurality of end users or customer sub-networks (subnets). The tree aggregated network 500 may comprise a server or router (r) 510, an ISP network 520, a first server ($t_1$) 530 and a second server ($t_2$) 535, and a plurality of subnets 540 (labeled 11, 12, 21, 22, and 23). The components of the tree aggregated network 500 may be configured substantially similar to the corresponding components described above. For instance, the ISP network 520 may be an Ethernet based network, an IP network, a PON, or a DSL network that provides content from r to $t_1$ and $t_2$. The subnets 540 may comprise any content provider/customer networks that enable the user equipments to establish connections to the $t_1$ and $t_2$, such as a cable network, a TV dish network, a Wireless Fidelity (WiFi) network based on Institute of Electrical and Electronics Engineers (IEEE) standard 802.11, a Worldwide Interoperability for Microwave Access (WiMAX) network, or a Third Generation Partnership Project (3GPP) network.

The servers $t_1$ and $t_2$ may be used as aggregation points for traffic from the server/router r and the service provider network 520 to the subnets. For example, $t_1$ may aggregate incoming traffic to subnets 11 and 12 and $t_2$ may aggregate incoming traffic to subnets 21, 22, and 23. Accordingly, $t_1$ and $t_2$ may merge a plurality routing elements in the routing matrix that correspond to their associated subnets into a single (aggregated) routing element, which may further reduce the routing matrix data and improve its scalability. For example, $t_1$ may combine two routing elements corresponding to subnets 11 and 12 into a single (aggregated) routing element that may indicate their combined or aggregated traffic potions. Similarly, $t_2$ may combine three routing elements corresponding to subnets 21, 22, and 23 into a single (aggregated) routing element.

Figure 6:
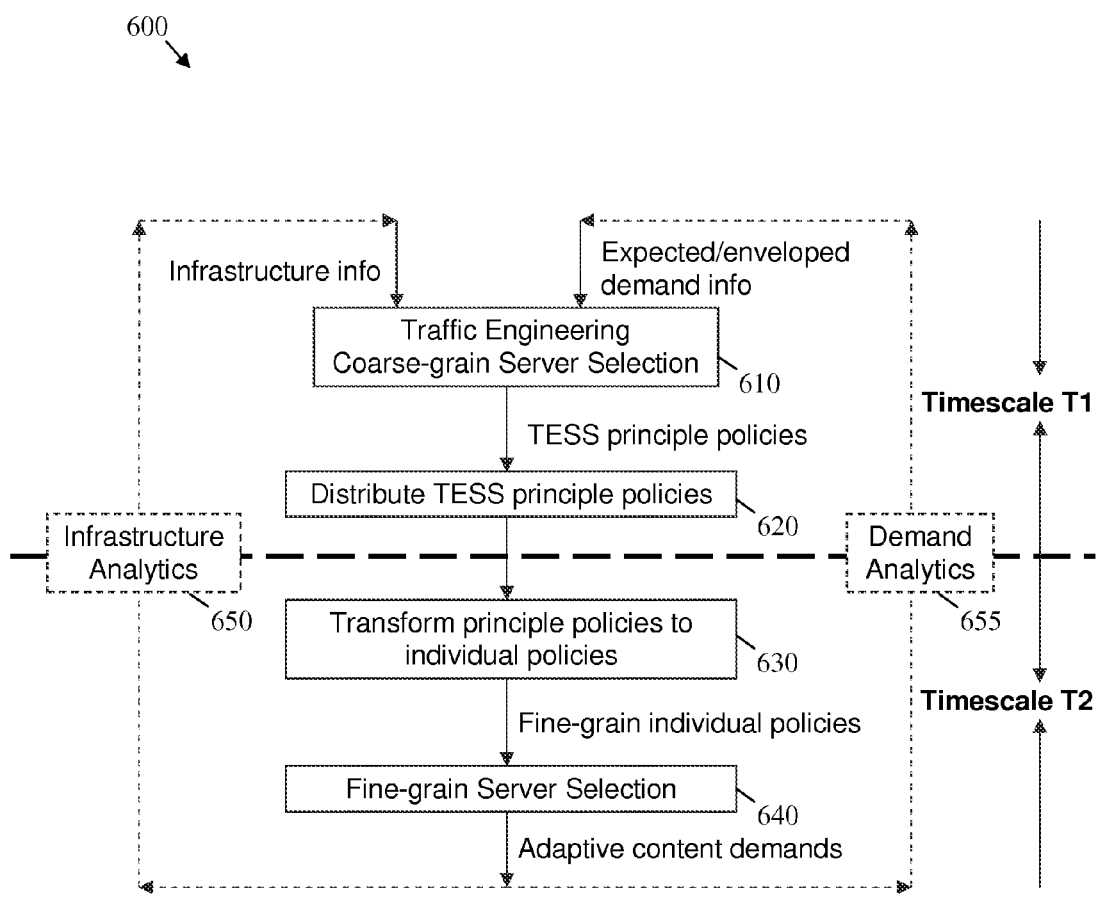
FIG. 6 is a flowchart of an embodiment of a joint TE and SS method.

FIG. 6 illustrates an embodiment of a joint TE and SS method 600, which may be used to solve the joint TE and SS optimization problem. For example, the joint TE and SS method 600 may be used in the joint TE and SS system 100. The joint TE and SS method 600 may also provide the routing matrix and the traffic matrix for each sever-terminal pair in the network, such as the case of the multi-server and multi-path allocation 300. At block 610, a TE coarse-grain SS may be implemented, e.g. by an ISP. For instance, the ISP may collect infrastructure information and analyze historical content demand information for end users, and derive coarse-grain enveloped demand. The ISP may then use the coarse-grain enveloped demand to solve the joint TE and coarse-grain SS problem, and thus compute the principle (TE) policies. The ISP may also collect SS policies from the content providers/customers. For instance, the joint TE and coarse-grain SS problem may be solved at Phase 1 by the global TE-SS component 110, which may maintain at least some of the historical content demand information and SS policies based on feedback from the SS component 120.

At block 620, the joint TE and SS (TESS) principle policies may be distributed, e.g. to the content providers/customers. For instance, the global TE-SS component 110 may distribute the TESS policies to the SS component 120. In some embodiments, the TESS policies may be first distributed to a local TE component, which may implement a local TE process and then forward the policies, which may be refined, to the content providers/customers. For the local TE component 115 may use the policies from the global TE-SS component 110 to implement a local TE process at Phase 2 and then forward the policies, which may be refined, to the SS component 120. At block 630, the principle policies may be transformed to individual policies, e.g. by the content providers/customers. The content providers/customers may transform the joint TESS principle policies received from the ISP into fine-grain individual policies, which may be customized for each content provider/customer use. For instance, the policies from the global TE-SS component 110 may be converted into the fine-grain individual policies at the SS component 120 at Phase 3. In some embodiments, the SS component 120 may convert the policies received from the local TE component 115 or from both the local TE component 115 and the global TE-SS component 110.

At block 640, the fine-grain SS may be implemented, e.g. by the content provider/customer. For instance, the content provider/customer may apply the fine-grain individual policies to SS and demand adaptation. The content provider/customer may implement the SS process to compute the fine-grain individual policies and output the adaptive content demands. For instance, the fine-grain SS may be solved at Phase 3 by the SS component 120. At block 650, infrastructure analytics may be implemented, e.g. by the ISP. The ISP may monitor the output of the content provider/customer and analyze infrastructure information using the adaptive content demand from the content provider/customer and output infrastructure information. At block 655, demand analytics may be implemented, e.g. by the ISP. As in the case of the infrastructure analytics, the ISP may monitor the output of the content provider/customer and analyze the historical content demand information using the adaptive content demand from the content provider/customer. As such, the ISP may output expected or enveloped demand information based on the adaptive content demand. Blocks 650 and 655 may be optional and may be implemented in a parallel manner, e.g. at about the same time periods. The method 600 may return to block 610 after block 650 and block 655, where the infrastructure information and the expected/enveloped demand information may be used as feedback to implement the TE coarse-grain SS.

In the method 600, blocks 610 and 620 may be implemented in coarse-grain timescales or at Phase 1, for example on the order of daily or hourly. Blocks 630 and 640 may be implemented in fine-grain timescales or at Phase 1, for example on the order of milliseconds or seconds. Blocks 650 and 655 may be implemented in coarse-grain timescales, such as blocks 610 and 620, or in fine-grain timescales, such as blocks 630 and 640. The method 600 may provide a feasible formulation and efficient two-timescale (or three-timescale) joint TE and SS problem solution, e.g. in comparison to current implementations that treat the TE and SS problems separately and/or using a single timescale. Additionally, the method 600 may allow relatively fast and adaptive response to relatively fast changing network conditions, for example by implementing blocks 650 and 655 in fine-grain timescales. The method 600 may also be flexible having configurable, dynamically changing, and adjustable time granularity. Additionally, the method 600 may implement any of the compact or reduce routing matrix representation schemes described above, and thus may have improved space usage and scalability in the network.

Figure 7:
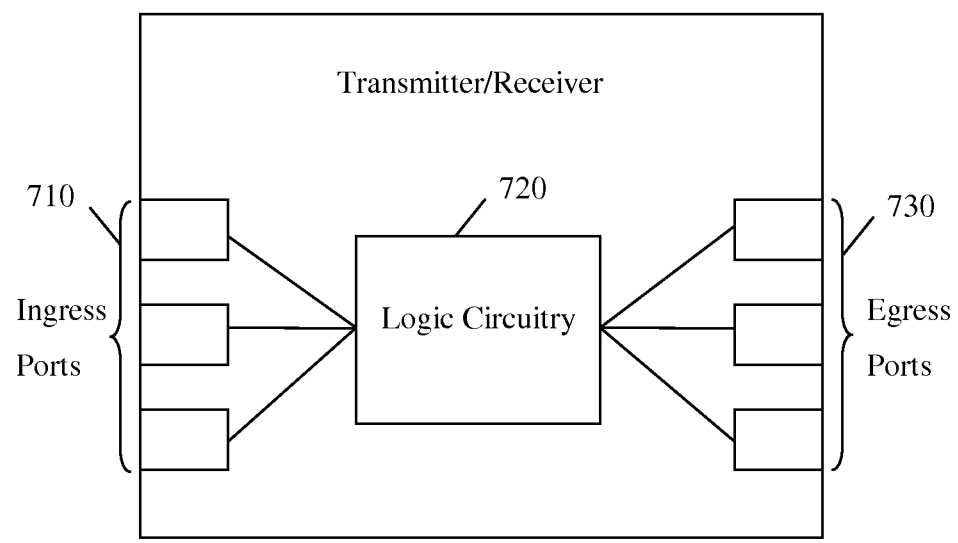
FIG. 7 is a schematic diagram of an embodiment of a transmitter/receiver unit.

FIG. 7 illustrates an embodiment of a transmitter/receiver unit 700, which may be any device that transports packets through a network. For instance, the transmitter/receiver unit 700 may be located in the router node 400 or any node in the joint TE and SS system 100, the local TE scheme 200, the multi-server and multi-path allocation 300, or the tree aggregated network 500. The transmitted/receiver unit 700 may comprise one or more ingress ports or units 710 for receiving packets, objects, or type-length-values (TLVs) from other network components, logic circuitry 720 to determine which network components to send the packets to, and one or more egress ports or units 730 for transmitting frames to the other network components.

Figure 8:
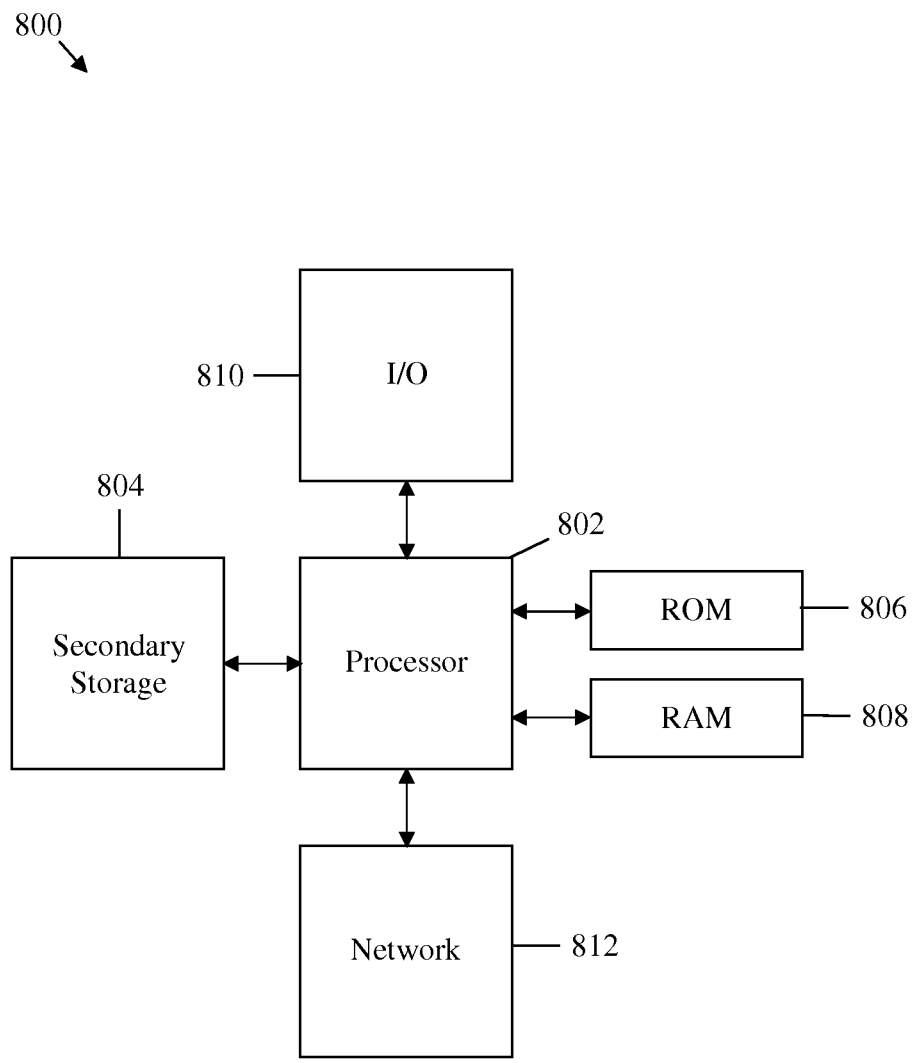
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including second storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The second storage 804 is typically comprised of one or more disk drives or tape drives and is used for non-volatile storage of data and as an over-flow data storage device if RAM 808 is not large enough to hold all working data. Second storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of second storage 804. The RAM 808 is used to store volatile data and perhaps to store instructions. Access to both ROM 806 and RAM 808 is typically faster than to second storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a traffic engineering (TE) and server selection (SS) component configured to couple to an SS component and operate at a first time scale based on SS policies from the SS component,
wherein the SS component is configured to operate at a second timescale based on TE policies from the TE and SS component,
wherein the TE and SS component is further configured to couple to a timer component that is configured to determine the time granularity of the first timescale,
wherein the SS component is coupled to an applications component that is configured to receive the SS policies,
wherein the second timescale is determined based on requests from the applications component, and
wherein the second timescale has a finer time granularity than the first time scale by at least two orders of magnitude.

2. An apparatus comprising:
a global traffic engineering (TE) and server selection (SS) component configured to couple to an SS component and operate at a first time scale based on SS policies from the SS component,
wherein the SS component is configured to operate at a second timescale based on global TE policies from the global TE and SS component,
wherein the second timescale has a finer time granularity than the first time scale by at least one order of magnitude, and
wherein a local TE component coupled to the global TE and SS component and the SS component, and
wherein the local TE component is configured to operate at a third timescale based on local TE policies stored at the local TE component, the SS policies, or both.

3. The apparatus of claim 2, wherein the third timescale has a coarser time granularity than the second timescale and has a finer granularity than the first timescale.

4. The apparatus of claim 2, wherein the global TE and SS component is configured to couple to a router or switch that is configured to receive global TE-SS policies from the global TE and SS component.

5. The apparatus of claim 4, wherein the router or switch is coupled to an upstream node via an ingress link and to a downstream node via an egress link, and wherein traffic is routed across the ingress link and the egress link based on the local TE policies.

6. The apparatus of claim 5, wherein routing on the ingress link is determined based on a first routing element of a first routing matrix, wherein the first routing element is associated with the upstream node, wherein routing on the egress link is determined based on a second routing element of a second routing matrix, and wherein the second routing element is associated with the router or switch.

7. The apparatus of claim 6, wherein the first routing element or the second routing element is further associated with a terminal, and wherein the traffic comprises aggregated traffic that is directed from one or more servers to the terminal.

8. A network transmitter/receiver unit comprising:
a receiver;
a transmitter; and
a processor coupled to the receiver and the transmitter and configured to implement a global traffic engineering (TE) and server selection (SS) component, a local SS component, and a local TE component,
wherein the global TE and SS component is configured to:
communicate with the local SS component; and
operate at a first time scale based on SS policies from the local SS component,
wherein the local SS component is configured to operate at a second timescale based on global TE policies from the global TE and SS component, wherein the second timescale has a finer time granularity than the first time scale by at least one order of magnitude, and
wherein a local TE component is configured to:
communicate with the global TE and SS component and the SS component, and
operate at a third timescale based on local TE policies, the SS policies from the SS component, or both.

9. The network transmitter/receiver unit of claim 8, wherein the third timescale has a coarser time granularity than the second timescale and has a finer granularity than the first timescale.

10. The network transmitter/receiver unit of claim 8, wherein the network transmitter/receiver unit is further configured to route traffic based on the global TE-SS policies from the global TE and SS component.

11. The network transmitter/receiver unit of claim 10, wherein the receiver is coupled to an upstream node via an ingress link, wherein the transmitter is coupled to a downstream node via an egress link, and wherein the processor is configured to:
receive traffic from the ingress link via the receiver; and
forward the traffic across the egress link via the transmitter based on the local TE policies.

12. The network transmitter/receiver unit of claim 11, further comprising a memory coupled to the processor, wherein the memory comprises a routing matrix, and wherein the processor routes the traffic on the egress link based on a routing element of the routing matrix.

13. The network transmitter/receiver unit of claim 12, wherein the routing element is associated with a terminal, and wherein the traffic comprises aggregated traffic that is directed from one or more servers to the terminal.

* * * * *